United States Patent
Sivalingham (10) Patent No.: US 7,154,903 B2
(45) Date of Patent: Dec. 26, 2006

(54) SYSTEM AND METHOD FOR MANAGEMENT OF DATA ASSOCIATED WITH A DORMANT MOBILE TERMINAL

(75) Inventor: Sanjeevan Sivalingham, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 902 days.

(21) Appl. No.: 10/036,057

(22) Filed: Oct. 19, 2001

(65) Prior Publication Data

US 2003/0076804 A1  Apr. 24, 2003

(51) Int. Cl.
*H04L 12/54* (2006.01)

(52) U.S. Cl. ............ 370/429; 370/338; 455/412.1

(58) Field of Classification Search ........... 370/429, 370/428
See application file for complete search history.

(56) References Cited

U.S. PATENT DOCUMENTS

| | | | | |
|---|---|---|---|---|
| 5,903,557 | A * | 5/1999 | Johansson et al. | 370/349 |
| 6,377,790 | B1 * | 4/2002 | Ishii | 455/343.1 |
| 6,501,733 | B1 * | 12/2002 | Falco et al. | 370/235 |
| 6,654,360 | B1 * | 11/2003 | Abrol | 370/329 |
| 6,904,028 | B1 * | 6/2005 | Semper | 370/331 |
| 6,904,288 | B1 * | 6/2005 | Rosen et al. | 455/518 |
| 2002/0041576 | A1 * | 4/2002 | Chang et al. | 370/331 |
| 2002/0068588 | A1 | 6/2002 | Yoshida et al. | |
| 2002/0080774 | A1 * | 6/2002 | Griffith et al. | 370/352 |
| 2002/0176382 | A1 * | 11/2002 | Madour et al. | 370/331 |

FOREIGN PATENT DOCUMENTS

| | | |
|---|---|---|
| EP | 1063863 | 12/2000 |
| WO | WO 0044149 | 7/2000 |
| WO | WO 0167675 | 9/2001 |

* cited by examiner

*Primary Examiner*—Hassan Kizou
*Assistant Examiner*—Anthony Sol
(74) *Attorney, Agent, or Firm*—Coats & Bennett, P.L.L.C.

(57) ABSTRACT

A packet control function (PCF) within a wireless communication network, such as a network based on the TIA/EIA/IS-2000 family of standards, manages incoming data for dormant mobile terminals. In response to the PCF receiving incoming data for a dormant mobile terminal, it starts a reactivation timer, begins buffering the incoming data, and initiates reactivation of the mobile terminal. If the network reestablishes connection with the mobile terminal before expiration of the reactivation timer, the PCF transfers buffered data to the mobile terminal; otherwise, it flushes the buffered data and resets the timer. Subsequent incoming data causes this process to repeat, but the timer's expiration period limits the repeat interval. This period limits the frequency at which reactivation is attempted, thus limiting network signaling overhead. Further, the PCF limits the memory needed for buffering incoming data, by discarding data received during the expiration period in excess of a defined buffer limit.

49 Claims, 4 Drawing Sheets

SYSTEM AND METHOD FOR MANAGEMENT OF DATA ASSOCIATED WITH A DORMANT MOBILE TERMINAL

BACKGROUND OF THE INVENTION

The present invention generally relates to wireless communication networks, and particularly relates to networks that maintain dormant or inactive packet data sessions for mobile terminals.

Changes in the type of data accessed by users through wireless communication networks have changed the nature of call management. Not too many years ago, users of wireless communication networks used such networks primarily for voice call services. In this respect, wireless call management was similar to that used in the circuit-oriented world of wire line telephone service, albeit with special provisions for maximizing the number of users supported by a limited radio frequency spectrum.

In support of a voice call, a network typically allocates physical and logical resources to support the call. Physical resources might include RF transceivers at a radio base station and digital signal processors within a base station controller, while logical resources might include network transport channels for conveying call data and control information between various network entities. Even though some of these resources were shared, by time multiplexing with other users for example, many call processing resources conventionally remain dedicated to the user for the duration of the voice call.

This approach to resource management makes sense where the user's use of such resources is essentially continuous, as during a voice conversation. However, where the user only intermittently uses such resources, with potentially long idle periods between active periods, this approach entails significant inefficiencies. This type of intermittent usage characterizes the newer services offered by wireless communication networks.

Web browsing and other types of Internet-based activities, such as sending and receiving email, or receiving stock quotes, are by their very nature intermittent activities. Communication networks supporting packet data sessions use different call resource management techniques to capitalize on the intermittent nature of packet data communication. Networks based on the TIA/EIA/IS-2000 (IS-2000) family of standards exemplify contemporary wireless networks providing packet data services to users.

IS-2000 networks, as well as certain other types of networks, gain efficiency by de-allocating selected network resources during the dormant periods of a packet data session with a mobile terminal. Generally, the point-to-point protocol (PPP) connection is maintained over the dormant periods, but traffic channel and associated resources are released for use in supporting other mobile terminals. Thus, when the network receives data from an outside network, such as the Internet, it must buffer the data and then deliver it to the dormant mobile terminal after reactivation of that terminal.

Without effective control measures, buffering incoming data for dormant mobile terminals might overwhelm the network in terms of required storage space and signaling overhead associated with attempting to reactivate the involved mobile terminals. Thus, an approach that satisfies the requirements for buffering incoming data, yet manages buffering in a manner that limits the amount of buffer memory needed, and reduces reactivation signaling overhead is needed.

BRIEF SUMMARY OF THE INVENTION

The present invention comprises a system and method of buffering packet data associated with dormant mobile terminals at a packet control function (PCF) in a wireless communication network, such as in an IS-2000 network. The PCF uses a reactivation timer to limit the amount of memory used for buffering data, and to reduce network signaling overhead associated with attempted reactivation of a dormant mobile terminal. A reactivation cycle begins when the PCF receives incoming data for a dormant mobile terminal. The PCF starts a reactivation timer, begins buffering the incoming data, and initiates connection reestablishment with the dormant mobile terminal. If the connection is reestablished before expiration of the timer, the PCF transfers the buffered data to the terminal; otherwise, the data is discarded. Also, any data received during the cycle in excess of a defined buffer limit is discarded.

Because data is preferably buffered only up to the buffer limit, and buffered data is discarded upon expiration of the reactivation timer, the amount of physical memory needed at the PCF for data buffering is limited to reasonable amounts. Of course, the aggregate buffer memory required at the PCF depends on the maximum number of dormant mobile terminals for which data buffering is desired. In addition to providing defined limits on the amount of buffer memory needed, use of the reactivation timer reduces network signaling overhead.

Generally, the reactivation timer's expiration period is set to match the expected maximum reactivation time of the dormant mobile terminal. This setting allows the PCF to issue a reactivation request, and then wait up to the expected maximum time before deciding whether such reactivation was successful. To wait a lesser time period might result in prematurely issuing one or more additional reactivation requests before the network and mobile terminal have had a chance to respond to the first reactivation request. Waiting for a longer time period results in the PCF holding unto buffered data for the dormant mobile even though reactivation request has been unsuccessful.

DETAILED DESCRIPTION OF THE INVENTION

Figure 1:
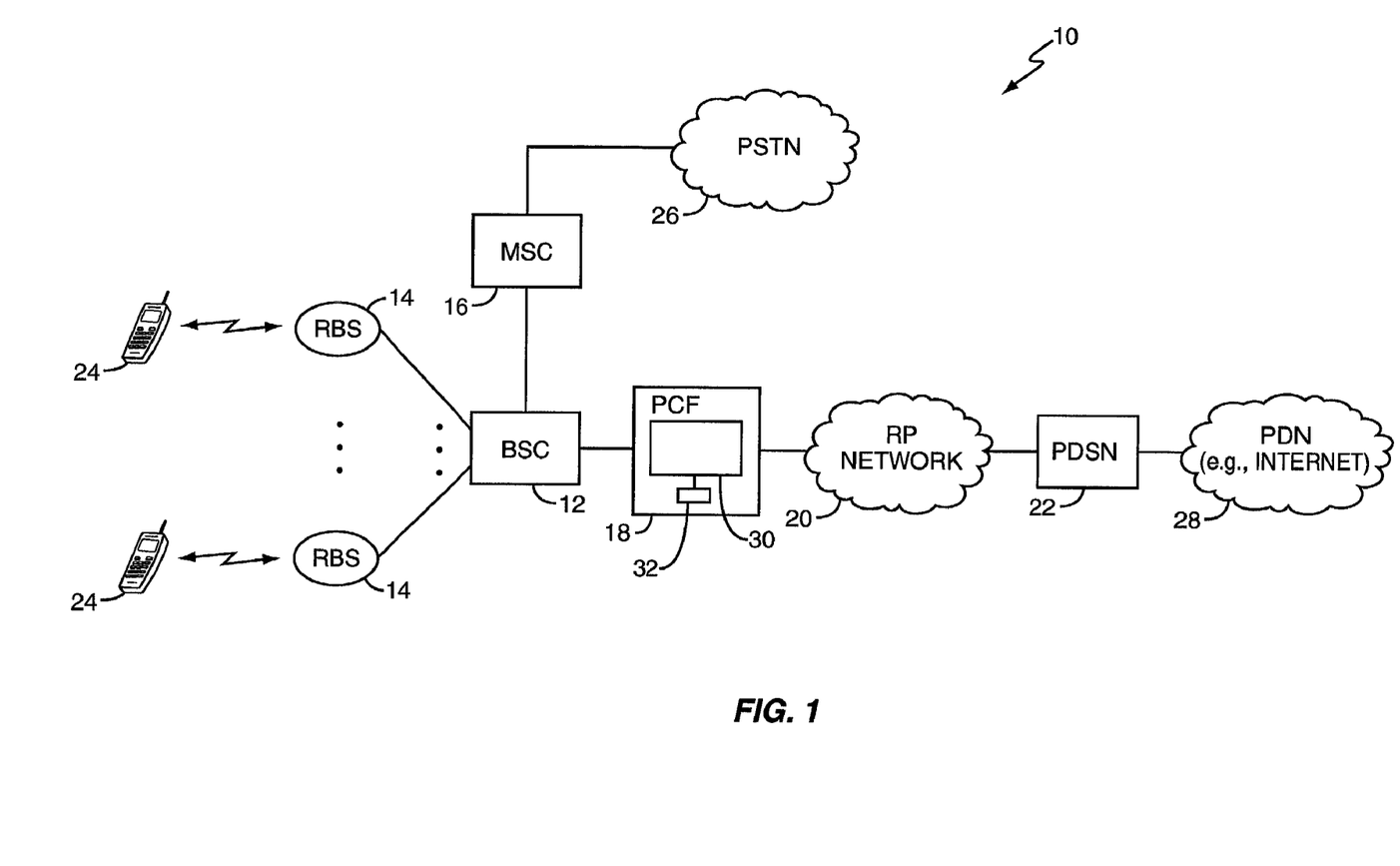
FIG. 1 is a diagram of an exemplary wireless communication network.

FIG. 1 illustrates an exemplary wireless communication network generally described by the numeral 10, and comprising a base station controller (BSC) 12, one or more radio base stations (RBSs) 14, a mobile switching center (MSC) 16, a packet control function (PCF) 18, a radio-packet (RP) network 20, and a packet data serving node (PDSN) 22. In actuality, the network 10 may include one or more of any of the above-named entities, and may include additional entities not shown in this simplified illustration.

The BSC 12 controls RBSs 14, which communicate via RF signaling through the air interface with one or more mobile terminals 24. Mobile terminal users may communicate with users of the public switched telephone network (PSTN) 26 via the MSC 16, and may communicate with one or more public data networks (PDNs) 28, such as the Internet, via the PDSN 22. When a user communicates with the PSTN 26, the BSC 12 cooperates with the MSC 16 in setting up the call, which entails allocating the necessary call processing resources in the RBSs 14, the BSC 12, and the MSC 16. Similarly, when a user establishes a packet data session with the PDN 28, network resources spanning one or more RBSs 14 to the PDSN 22 are allocated to support the session.

However, because of the intermittent activity of the typical packet data session, the network 10 gains efficiency by de-allocating at least some of the network resources associated with a given mobile terminal 24 when that terminal's packet data session becomes dormant. The better appreciate what is meant by "dormancy," one must first understand the typical states associated with a given packet data session, and must further understand the basic functioning of the network entities involved in supporting that packet data session.

Figure 2:
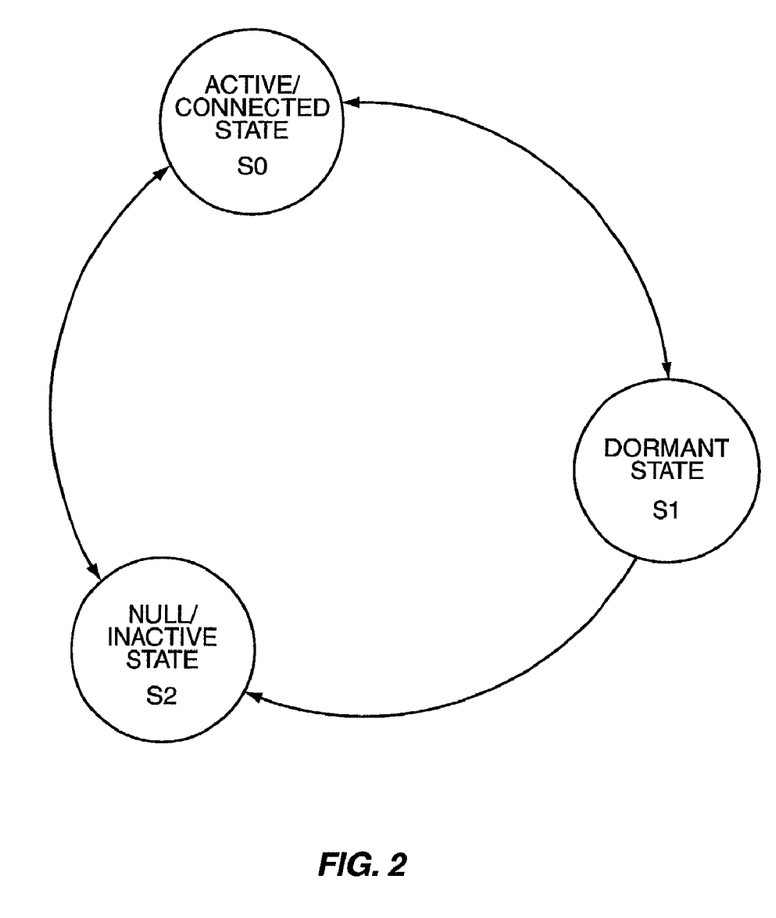
FIG. 2 is a state diagram illustrating exemplary packet data session states.

FIG. 2 illustrates the typical states of a given mobile terminal's packet data session. When a mobile terminal 24 is connected to the network 10 and actively receiving and/or transmitting packet data, it is considered to be in active/connected state (S0). In the active state, the network 10 maintains connection resources at least in the RBS(s) 14, the BSC 12, the PCF 18, and the PDSN 22. More particularly, in the active state, a physical traffic channel exists between the mobile terminal 24 and the supporting RBS 14, and either side may send or receive data. In the dormant state (S1), no physical traffic channel exists between the mobile terminal 24 and the RBS 14, but the PPP link between the mobile terminal 24 and the PDSN 22 is maintained. In the null/inactive state (S2), there is no traffic channel between the mobile terminal 24 and the RBS 14, and no PPP link exists between the mobile terminal 24 and the PDSN 22.

Note that in operation, a mobile terminal 24 can transition back and forth between the active state and the dormant state, but once the terminal 24 transitions to the null/inactive state, the terminal 24 must transition through the active state before it can assume the dormant state again. Simply, this means that once the terminal 24 is dormant too long, the PPP link for that terminal is dropped and the terminal must establish a new connection to the network 10 before resuming packet data communications. Generally, the network 10 maintains some type of timer to determine how long a mobile terminal 24 can remain in the dormant state before its PPP link is dropped.

In an IS-2000 network employing standardized network entity interfaces in accordance with defined interoperability standards, A1 connections between the BSC 12 and the MSC 16 and A8 connections between the BSC 12 and the RBS 14 are maintained in the active/connected state and released in the dormant and null states. A10 connection resources between the PCF 18 and the PDSN 22 are maintained in the dormant state. Maintaining this connection between the PCF 18 and the PDSN 22 through the RP network 20 allows the network 10 to maintain the PPP link in the PDSN. When the mobile terminal 24 transitions to the null state, the PPP link is discontinued and the A10 connection released. One may refer to the Internet Engineering Task Force's (IETF) Request for Comments (RFC) 1661 for protocol details regarding PPP.

In operation, the PDSN 22 serves as a gateway router between the network 10 and the Internet or other PDN 28. The PDSN 22 establishes, maintains, and terminates the PPP session with the mobile terminal 24. The PCF 18 and PDSN 22 establish a RP session through the RP network 20 for communicating via the standardized A10/A11 interoperability interfaces. Packet data directed to a mobile terminal 24 supported by the network 10 is routed to the PDSN 22, which then passes the data in the form of one or more data packets to the PCF 18. If the mobile terminal 24 has an active session established with the network 10, the PCF 18 simply transfers the packet data it receives from the PDSN 22 to the BSC 12, which then directs the received data to the appropriate RBS 14 for wireless transmission to the mobile terminal 24.

In the context of the above operations, the PCF 18 establishes, maintains, and terminates a data link protocol to the PDSN 22 via the RP network interface 20. The PCF 18 further requests radio resources from the network 10 to support the exchange of packets between the PDSN 22 and a mobile terminal 24. The PCF 18 also maintains knowledge of radio resources (e.g., active, dormant) for the packet data sessions it is supporting.

Oftentimes, however, the incoming data from the PDSN 22 corresponds to a dormant mobile terminal 24. In this circumstance, the PCF 18 cannot simply transfer the incoming data to the BSC 12 rather it must buffer the data for later delivery to the mobile terminal 24. This necessity arises because radio resources are not maintained in the RBSs 14 and BSC 12 for dormant sessions. While the IS-2000 family of standards specifies that the PCF 18 should perform buffering in this general context, the standards do not define any particular approach to data buffering, and thus leave the network 10 vulnerable to difficulties in managing buffering operations.

Absent buffering control as provided by the present invention, data buffering operations in the PCF 18 might quickly exhaust reasonable memory capacity, and might result in generating reactivation requests too frequently. To avoid these possibilities, the PCF 18 starts a timer upon receiving data for a dormant mobile terminal 24. The timer's expiration period defines a reactivation cycle, and the rate of PCF-generated reactivation requests is limited to the cycle time of the reactivation timer. This reduces signaling overhead in the network 10.

Further, if the dormant mobile terminal 24 is not reactivated within the timer's expiration period, the PCF 18 discards buffered data, resets the timer, and makes itself ready for subsequent reactivation attempts associated with later incoming data. Additionally, during the reactivation cycle, incoming data exceeding a defined or desired buffer limit is discarded, thereby avoiding the need for overly large data buffers. Where data intended for the mobile terminal 24 is discarded, other supporting protocols, such as TCP/IP, may provide for retransmission of the discarded data. Note that the buffer limit may be defined as a configurable parameter, and the PCF 18 might use different buffer limit sizes when buffering data for a plurality of mobile terminals 24.

The PCF 18 contains one or more processors or processing systems 30, which may perform the operations described above. In such operations, the processor 30 may use memory 32 in data buffering operations. Indeed, one aspect of the present invention involves limiting the amount of memory needed for data buffering to avoid excessive memory requirements.

Figure 3:
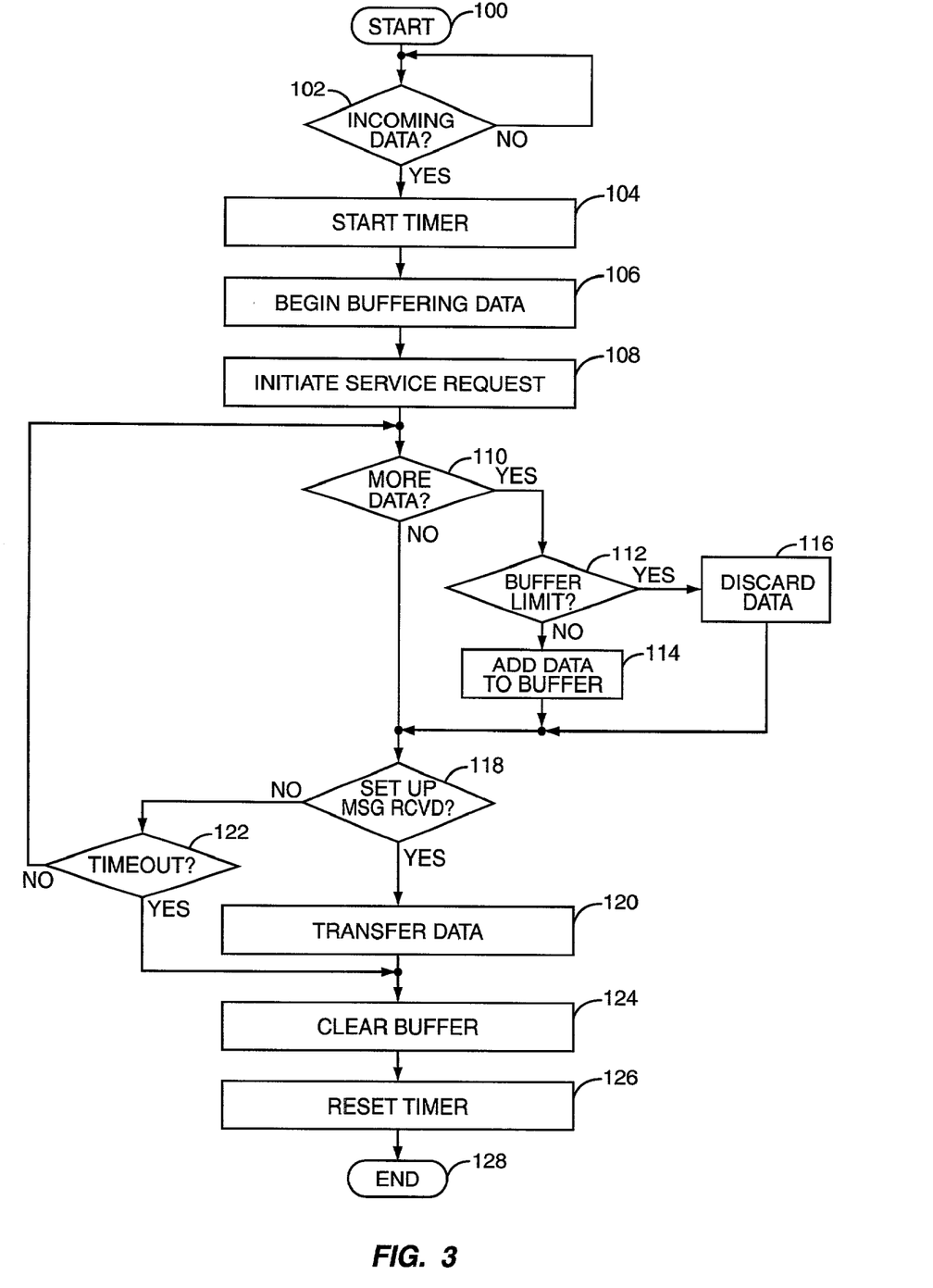
FIG. 3 is a logic flow diagram illustrating exemplary data buffering in accordance with the present invention.

FIG. 3 illustrates exemplary logic for one embodiment of the present invention, in which the PCF 18 performs exemplary data buffering for a dormant mobile terminal 24. it should be understood that this logic flow represents one aspect of overall PCF functionality, and may represent one of many programming threads or functions executed by the PCF 18. Further, the logic flow concerns operations for a given one of the mobile terminals 24 but it should be understood that the illustrated services could be provided for a plurality of terminals 24.

Processing begins (step 100) with PCF 18 monitoring for incoming data (step 102). When the PCF 18 receives packet data from the PDSN 22 intended for the dormant mobile terminal 24, it starts a reactivation timer (step 104) and begins buffering the incoming data (step 106). The PCF 18 also initiates reactivation of the dormant mobile terminal 24 associated with the incoming data (step 108). That is, the PCF 18 attempts to reestablish an active connection between the mobile terminal 24 and the network 10.

Incoming data generally carries some type of identifier, which allows the PCF 18 to determine the mobile terminal 24 to which the data should be directed. The PCF 18 can use this information to request reactivation of the correct mobile terminal 24. In particular, the incoming data contains a GRE (Generic Routing Encapsulation) Key that is assigned by the PCF/PDSN during A10 connection setup to identify data associated the mobile terminal 24. The GRE Key assignment is temporary and lasts for the duration of the A10 connection. In an IS-2000 network, each mobile terminal 24 also has a more permanent identifier referred to as International Mobile Station Identifiers (IMSI). The PCF maintains a mapping between the GRE Key assigned for a mobile terminal 24 and the terminal's IMSI. The PCF uses the IMSI to identify a mobile terminal when requesting (from the BSC) a reactivation of that terminal.

After initiating connection reestablishment, the PCF 18 begins monitoring for additional incoming data (step 110). If more data is received, the PCF 18 determines whether the maximum amount of data has been received (step 112). If not, the PCF 18 adds the additional incoming data to the buffer in memory 32 (step 114). If the maximum buffer limit has been reached, the PCF 18 discards any additional incoming data (step 116).

Note that the PCF 18 may use any number of techniques for discarding incoming data. For example, the PCF 18 may discard data on a last-in basis, such that some or all later arriving incoming data is discarded if buffering that later arriving data would exceed the defined buffer limit, which limit may be implemented as a configurable limit. As an alternative to that approach, the PCF 18 might discard data on a first-in basis. With that approach, the PCF 18 discards some or all earlier arriving data already in the buffer to avoid exceeding the defined buffer limit, if adding additional, later arriving data to the buffer would exceed the defined buffer limit.

The PCF 18 then checks to see whether the reactivation indicator has been received from the BSC 12 (step 118). If so, the mobile terminal 24 was reactivated before expiration of the reactivation timer, and the PCF 18 transfers the buffered data to the BSC 12 for delivery to the mobile terminal 24 (step 120). Note that in instances where the PCF 18 discarded some of the incoming data for the mobile terminal 24 to stay within buffer limits, either later or earlier arriving buffered data is transferred to the BSC 12, depending on whether the PCF discards data on a first-in or last-in basis.

If the reactivation indicator has not been received, the PCF 18 determines whether the reactivation timer has expired (step 122). If the timer has expired, reactivation of the mobile terminal 24 has not been accomplished in the expected time interval, and in response the PCF 18 clears the buffer (step 124) and resets the timer (step 126). With these actions, processing for the current reactivation cycle ends (step 128) and the PCF 18 is ready to start again (i.e., return to step 100) for subsequently received data. If the timer has not expired, the PCF 18 returns to monitoring for incoming data (step 110), and processing repeats as above.

Figure 4:
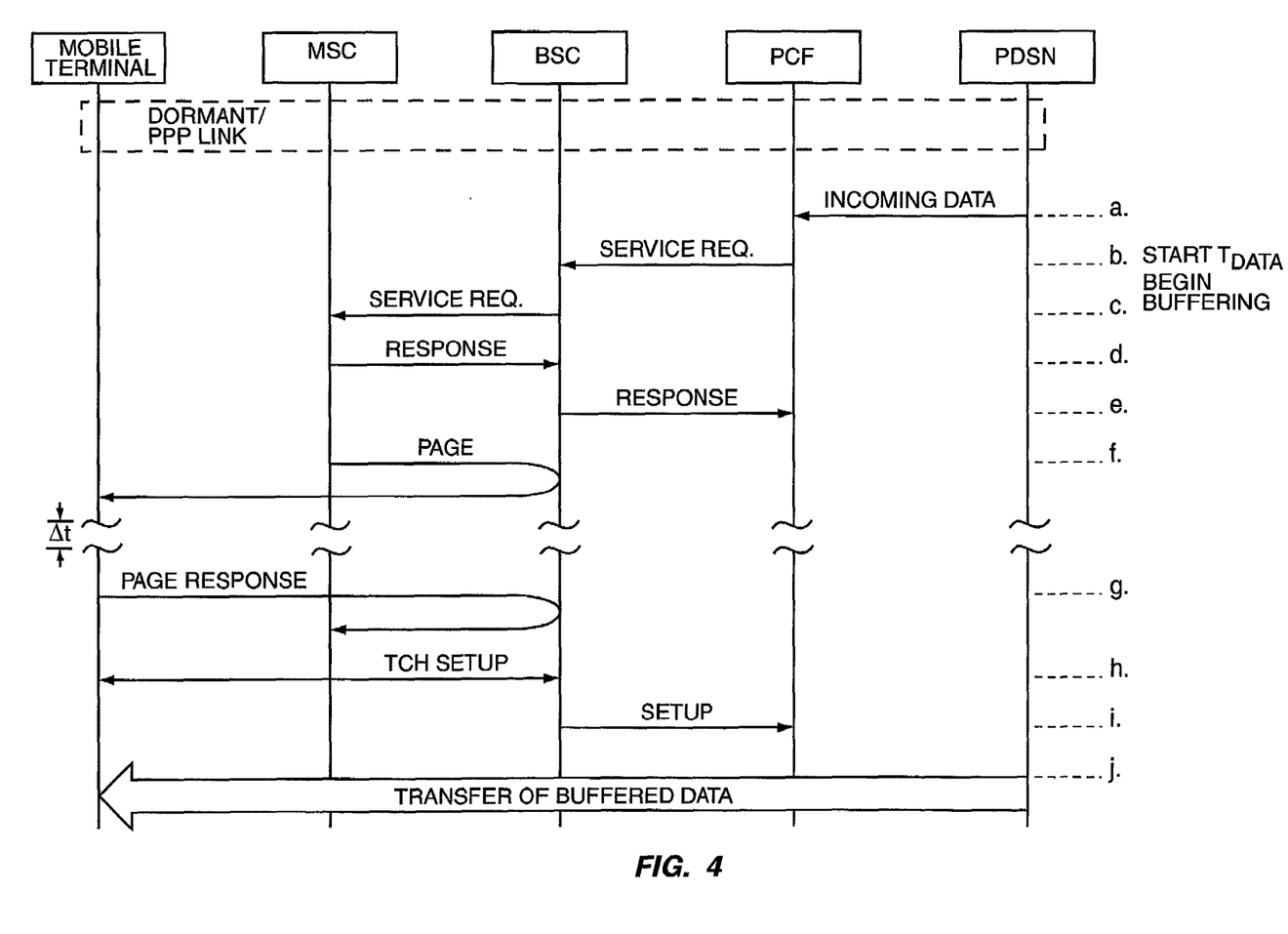
FIG. 4 is a call flow diagram illustrating exemplary network signaling in accordance with the present invention.

FIG. 4 illustrates an exemplary call flow diagram implementing the logic flow above. Call processing steps include these items:

a. The PCF 18 begins receiving incoming data from the PDSN 22.

b. After determining that the incoming data corresponds to a dormant mobile terminal 24, the PCF 18 begins buffering the data, starts its reactivation timer $T_{DATA}$, and generates a service request message, which is transmitted to the BSC 12 via the A9 signaling interface between the PCF 18 and the BSC 12. As noted, the PCF 18 may use the IMSI information in the received data (packet header) to determine for which mobile terminal 24 the data is intended.

c. The BSC 12 generates a service request message responsive to the service request from the PCF 18, which message is sent to the MSC 16 via the A1 signaling interface between the BSC 12 and the MSC 16.

d. The MSC 16 responds to the service request from the BSC 12 by sending a service request response back to the BSC 12, if call processing resources are available.

e. Upon receiving the service response from the MSC 16, the BSC 12 provides a service response message to the PCF 18, which informs the PCF 18 that the network is attempting to reactivate the mobile terminal 24. The PCF 18 could, if the service response message is not received from the BSC 12 in the expected time frame, end processing here, flush its data buffer, and reset its reactivation timer $T_{DATA}$. However, the PCF 18 may simply wait until the reactivation timer expires before flushing its buffer and resetting the timer.

f. The MSC 16 generates a paging message for the dormant mobile terminal 24, which is transmitted via the BSC 12 (and corresponding RBS 14).

g. If reactivation is successful, the mobile terminal 24 transmits a paging response to the network's paging message. Generally, some amount of time Δt passes between the network's transmission of the paging message and the mobile terminal's paging response. The BSC 12 passes the paging response message through to the MSC 16.

h. A traffic channel is then established between the BSC 12 and the mobile terminal 24, which establishment requires allocation of radio resources in one or more of the RBSs 14 operating under control of the BSC 12.

i. After establishing the traffic channel between itself and the mobile terminal 24, the BSC 12 sends an A9 setup message to the PCF.

j. With successful reactivation of the mobile terminal 24 within the expiration period set by $T_{DATA}$, the PCF 18 transfers the buffered data via the BSC 12.

Earlier details noted that the expiration period of the reactivation timer $T_{DATA}$ might be matched to an expected or perhaps a maximum reactivation timer. The cumulative time for reactivation is easily visualized in the above call flow. That is, the expiration period might be set based on the expected time for the necessary network signaling, including the Δt time for the mobile terminal 24 to respond to the paging message from the network 10. Using exemplary estimates and assuming an IS-2000 network, the reactivation timer $T_{DATA}$ should be set to something on the order of thirty seconds. This setting allows roughly sixteen seconds to generate the paging message and receive the corresponding response from the mobile terminal 24, plus an additional ten or so seconds to establish the traffic channel and notify the PCF 18. Of course, there may be circumstances where $T_{DATA}$ is configured with greater or lesser expiration periods. As such, $T_{DATA}$ may be made a configurable parameter set as desired by the network operator.

In summary, then, the above discussion provides exemplary details for implementing a data-buffering scheme for dormant mobile terminals 24 within the PCF 18, such that data buffering memory requirements are reasonably bounded. Further, the techniques described above work to minimize the network signaling associated with attempting to reestablish connections with dormant mobile terminals 24. Setting defined buffer size limits bounds the maximum amount of memory needed to buffer data for a desired number of terminals 24, while use of reactivation timers sets the maximum rate or period at which incoming data for those terminals will initiate reactivation attempts. Therefore, the above details should not be construed as limiting the present invention rather it is limited only by the scope of the following claims and the reasonable equivalents thereof.

What is claimed is:

1. A method of managing incoming data for a dormant mobile terminal at a packet control function (PCF) in a wireless communication network, the method comprising:
   receiving incoming data from a public data network (PDN) for the dormant mobile terminal at the PCF, wherein the dormant mobile terminal has a Point-to-Point Protocol (PPP) connection with the PDN;
   starting a timer responsive to receiving the incoming data;
   initiating connection establishment between the dormant mobile terminal and the PCF responsive to the incoming data;
   buffering the received incoming data;
   transferring the buffered incoming data from the PCF to the previously dormant mobile terminal if the connection is established before expiration of the timer; and
   discarding the buffered incoming data if the connection between the dormant mobile terminal and the PCF is not established before expiration of the timer.

2. The method of claim 1 wherein buffering the received incoming data comprises buffering incoming data for the dormant mobile terminal up to a defined buffer limit.

3. The method of claim 2 further comprising continuing to buffer incoming data for the dormant mobile terminal received after starting the timer up to the defined buffer limit.

4. The method of claim 2 further comprising buffering at least a portion of incoming data for the mobile terminal received after starting the timer, such that incoming data for the dormant mobile terminal received before expiration of the timer is buffered up to the defined buffer limit.

5. The method of claim 2 further comprising implementing the defined buffer limit as a configurable buffer limit.

6. The method of claim 2 further comprising discarding incoming data on a last-in basis to avoid exceeding the defined buffer limit.

7. The method of claim 1 further comprising discarding data on a first-in basis to avoid exceeding the defined buffer limit.

8. The method of claim 1 further comprising managing incoming data for a plurality of dormant mobile terminals.

9. A method of managing incoming data for a dormant mobile terminal, wherein a packet control function (PCF) receives the data from a packet data serving node (PDSN) in a wireless communication network, the method comprising:
   receiving incoming data for the dormant mobile terminal from the PDSN at the PCF, wherein the dormant mobile terminal has a Point-to-Point Protocol (PPP) connection with the PDSN;
   starting a timer responsive to receiving the data;
   initiating connection reestablishment with the dormant mobile terminal responsive to receiving the data;
   buffering the incoming data up to a defined buffer limit;
   discarding any incoming data received after reaching the defined buffer limit;
   transferring buffered data from the PCF to the previously dormant mobile terminal if a connection with the mobile terminal is reestablished before expiration of the timer; and
   discarding the buffered data and resetting the timer if the connection with the mobile terminal is not reestablished before expiration of the timer.

10. The method of claim 9 further comprising configuring an expiration period of the timer to match an expected reactivation delay of the mobile terminal.

11. The method of claim 10 further comprising determining said expected reactivation delay based on an average expected time associated with said connection reestablishment.

12. The method of claim 9 further comprising setting the defined buffer limit to a value that accommodates an expected maximum data packet size.

13. The method of 9 further comprising setting the defined buffer limit according to a TCP window size.

14. The method of claim 9 further comprising repeating the steps of claim 1 after expiration of the timer if the mobile terminal remains dormant and subsequent data is received for the mobile terminal.

15. The method of claim 9 further comprising buffering incoming data for a plurality of dormant mobile terminals.

16. The method of claim 15 further comprising timing connection reestablishment for individual ones of said plurality of mobile terminals.

17. The method of claim 9 wherein initiating connection reestablishment with the dormant mobile terminal responsive to receiving the data comprises generating a service request message for a base station controller (BSC) associated with said mobile terminal.

18. The method of claim 9 wherein transferring buffered data from the PCF to the previously dormant mobile terminal comprises transferring the buffered data to a base station controller (BSC) associated with said mobile terminal.

19. A method of managing data for dormant mobile terminals within a wireless communication network, the method comprising:
   receiving data for a dormant mobile terminal from a packet data serving node (PDSN) at a packet control function (PCF), wherein the dormant mobile terminal has a Point-to-Point Protocol (PPP) connection with the PDSN;
   starting a timer at said PCF responsive to receiving the data;
   buffering incoming data received at the PCF for the dormant mobile terminal;
   initiating re-establishment of an active connection with the dormant mobile terminal by sending a service request from said PCF to a base station controller (BSC) associated with said dormant mobile terminal;

sending a service request from said BSC to a mobile station controller (MSC) responsive receiving the service request from said PCF;

paging the dormant mobile terminal from said MSC via said BSC responsive to receiving the service request from said BSC;

setting up a traffic channel between said BSC and said mobile terminal if the previously dormant mobile terminal responds to said paging request; and transferring the buffered data from said PCF to said mobile terminal via said BSC if said traffic channel is established before expiration of the timer;

discarding the buffered data at said PCF if said traffic channel is not established before expiration of the timer; and resetting the timer upon transferring the buffered data or upon expiration of the timer.

20. The method of claim 19 further comprising discarding at least a portion of the incoming data received for the dormant mobile terminal before expiration of the timer if an amount of incoming data received exceeds a defined buffer limit.

21. The method of claim 19 further comprising setting said defined buffer limit to a value matching an expected maximum packet data size.

22. The method of claim 19 further comprising paging the mobile terminal again if subsequent data is received for the dormant mobile terminal and the timer has been reset.

23. The method of claim 19 further comprising performing the steps of claim 1 for a plurality of dormant mobile terminals, wherein said PCF buffers data received for each one of said plurality of dormant mobile terminals.

24. The method of claim 19 further comprising basing signaling between said PCF, BSC, and MSC, on signaling standards defined for the wireless communication network.

25. The method of claim 24 wherein the wireless communication network is based on the TIA/EIA/IS-2000 standard, and further comprising said signaling based on the IOS v4.0 signaling standards.

26. The method of claim 19 further comprising setting the expiration period of the timer to be at or about thirty seconds.

27. The method of claim 19 further comprising setting the defined buffer limit to be at or about sixty-four kilobytes.

28. The method of claim 19 further comprising maintaining a buffer and a timer for each dormant mobile terminal for which data is received at said PCF.

29. A packet control function (PCF) for use in a wireless communication network, the PCF comprising:

at least one processor, wherein the at least one processor starts a timer and initiates connection re-establishment between the PCF and a dormant mobile terminal associated with the PCF in response to the PCF receiving incoming data from a packet data serving node (PDSN) for the dormant mobile terminal, and wherein the dormant mobile terminal has a Point-to-Point Protocol (PPP) connection with the PDSN;

memory, wherein the PCF buffers the received incoming data in the memory; and wherein the PCF discards the buffered incoming data from the memory if the connection cannot be reestablished before the timer has expired or transfers the buffered incoming data to the mobile terminal if the connection is re-established before the timer has expired.

30. The PCF of claim 29, wherein the PCF buffers the incoming data in the memory up to a defined buffer limit.

31. The PCF of claim 30, wherein the PCF continues buffering at least a portion of incoming data received after starting the timer up to the defined buffer limit.

32. The PCF of claim 30, wherein the PCF discards incoming data received in excess of the defined buffer limit.

33. The PCF of claim 30, wherein the PCF discards incoming data on a first-in basis to avoid exceeding the defined buffer limit.

34. The PCF of claim 30, wherein the PCF discards incoming data on a last-in basis to avoid exceeding the defined buffer limit.

35. The PCF of claim 30, wherein the PCF uses a configurable buffer limit as the defined buffer limit.

36. The PCF of claim 29, wherein the PCF maintains a timer and a corresponding buffer for each of a plurality of dormant mobile terminals.

37. The PCF of claim 29, wherein the PCF communicates with an originating network entity if buffered incoming data is discarded, such that the originating network entity retransmits at least a portion of the discarded data.

38. The PCF of claim 29, wherein the incoming data comprises packet data, and wherein the PCF buffers incoming packets up to a defined buffer limit, and transfers buffered packet data to the previously dormant mobile terminal in the order that the packet data was received at the PCF.

39. A packet control function (PCF) for use in a wireless communication network, the PCF comprising memory and at least one processor, said at least one processor adapted to:

start a timer responsive to receiving incoming data from a packet data serving node (PDSN) for a dormant mobile terminal associated with said PCF, wherein the dormant mobile terminal has a Point-to-Point Protocol (PPP) connection with the PDSN;

buffer the incoming data in said memory up to a defined buffer limit;

initiate connection reestablishment with the dormant mobile terminal responsive to the incoming data;

transfer buffered data from the PCF to the previously dormant mobile terminal if a connection with the mobile terminal is reestablished before expiration of the timer; and discard the buffered data and reset the timer if the connection with the mobile terminal is not reestablished before expiration of the timer.

40. The PCF of claim 39 wherein said at least one processor buffers incoming data for a plurality of dormant mobile terminals.

41. The PCF of claim 40 wherein said at least one processor maintains a separate buffer in said memory for buffering incoming data for each of said plurality of dormant mobile terminals that receives incoming date while dormant.

42. The PCF of claim 40 wherein said at least one processor maintains a separate timer for timing connection reestablishment of each of said plurality of dormant mobile terminals that receives incoming data.

43. The PCF of claim 39 wherein the timer has an expiration period matched to an expected maximum time for reestablishing connection with the mobile terminal.

44. The PCF of claim 39 wherein said at least one processor buffers the incoming data in said memory up to a defined buffer limit by discarding any incoming data received before expiration of the timer and in excess of said defined buffer limit.

45. The PCF of claim 39 wherein said at least one processor initiates connection reestablishment with the dormant mobile terminal responsive to the incoming data by sending a service request message to a base station controller (BSC) associated with the dormant mobile terminal.

46. The PCF of claim 45 wherein the wireless communication network is based on the TIA/EIA/IS-2000 standards, and wherein the processor sends said service request to the BSC by generating an A9 base station service request.

47. The PCF of claim 45 wherein said processor receives the incoming data through an A10 connection established between said PCF and a packet data serving node (PDSN).

48. The PCF of claim 39 wherein said processor transfers buffered data from the PCF to the previously dormant mobile terminal by transferring the buffered data to a base station controller associated with the previously dormant mobile terminal.

49. The PCF of claim 39 wherein said processor receives a setup request message from a base station controller associated with said PCF as indication that the connection was reestablished with the previously dormant mobile terminal.

* * * * *

UNITED STATES PATENT AND TRADEMARK OFFICE
CERTIFICATE OF CORRECTION

| | | |
|---|---|---|
| PATENT NO. | : 7,154,903 B2 | Page 1 of 1 |
| APPLICATION NO. | : 10/036057 | |
| DATED | : December 26, 2006 | |
| INVENTOR(S) | : Sivalingham | |

It is certified that error appears in the above-identified patent and that said Letters Patent is hereby corrected as shown below:

On the Face Page, in Field (56), under "U.S. PATENT DOCUMENTS", in Column 1, Line 6, delete "6,904,288 B1" and insert -- 6,904,288 B2 --, therefor.

In Column 4, Line 66, after "terminal 24." delete "it" and insert -- It --, therefor.

In Column 8, Line 31, in Claim 13, after "method of" insert -- claim --.

In Column 9, Line 16, in Claim 19, delete "reselling" and insert -- resetting --, therefor.

In Column 10, Line 52, in Claim 41, delete "date" and insert -- data --, therefor.

Signed and Sealed this

Twenty-fifth Day of March, 2008

JON W. DUDAS
*Director of the United States Patent and Trademark Office*